US006973126B1

United States Patent
Yoneyama et al.

(10) Patent No.: US 6,973,126 B1
(45) Date of Patent: Dec. 6, 2005

(54) VIDEO CODING APPARATUS ACCORDING TO A FEATURE OF A VIDEO PICTURE

(75) Inventors: Akio Yoneyama, Tokyo (JP); Yasuyuki Nakajima, Saitama (JP); Hiromasa Yanagihara, Saitama (JP); Masaru Sugano, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/515,896

(22) Filed: Feb. 29, 2000

(30) Foreign Application Priority Data

| Mar. 5, 1999 | (JP) | ................................. 11-058046 |
| Aug. 20, 1999 | (JP) | ................................. 11-234538 |

(51) Int. Cl.$^7$ .............................................. H04B 1/66
(52) U.S. Cl. .................................................. 375/240
(58) Field of Search .......................... 375/240, 240.01, 375/240.02, 240.03, 240.08, 240.09, 240.12, 375/240.13, 240.15, 240.16, 240.2, 240.22; 348/409.1, 412.1, 413.1, 415.1, 416.1, 384.1; 382/242; H04B 1/66; H04N 7/12

(56) References Cited

U.S. PATENT DOCUMENTS

| 5,485,213 | A | * | 1/1996 | Murashita et al. ........... 348/415 |
| 5,742,351 | A | * | 4/1998 | Guede ........................ 348/459 |
| 6,052,417 | A | * | 4/2000 | Fujiwara et al. ........ 375/240.12 |
| 6,057,893 | A | * | 5/2000 | Kojima et al. ............... 348/700 |
| 6,151,360 | A | * | 11/2000 | Kato et al. ............. 375/240.03 |
| 6,163,573 | A | * | 12/2000 | Mihara ................... 375/240.02 |
| 6,272,178 | B1 | * | 8/2001 | Nieweglowski et al. ...................... 375/240.03 |
| 6,313,863 | B1 | * | 11/2001 | Chida ...................... 348/14.01 |
| 6,324,216 | B1 | * | 11/2001 | Igarashi et al. ......... 375/240.14 |

* cited by examiner

Primary Examiner—Tung Vo
(74) Attorney, Agent, or Firm—Westerman, Hattori, Daniels & Adrian, LLP

(57) ABSTRACT

A variance between sequential video pictures is extracted, and then, a GOP boundary position is decided based on inter-frame variance information. Furthermore, simple motion estimation is carried out with respect to video pictures inside one GOP. If a motion variation between the video pictures is large, a small predictive frame interval is taken; to the contrary, if the motion variation is small, a large predictive frame interval is taken. The simple motion estimation is carried out between two downscaled feature planes at a timewise fixed interval with respect to a video picture which is discriminated to be an interlaced video picture, wherein a motion compensatory prediction error at that time is output as image variance information. If the image variance is small, coding is conducted by a frame structure; to the contrary, if the image variance is large, the coding is conducted by a field structure. With the above-described processing, it is possible to provide a video coding apparatus for deciding a GOP size and the predictive frame interval according to the feature of the input video picture, and another video coding apparatus for adaptively switching the coding by the frame/field structures according to the feature of the input video picture.

7 Claims, 11 Drawing Sheets

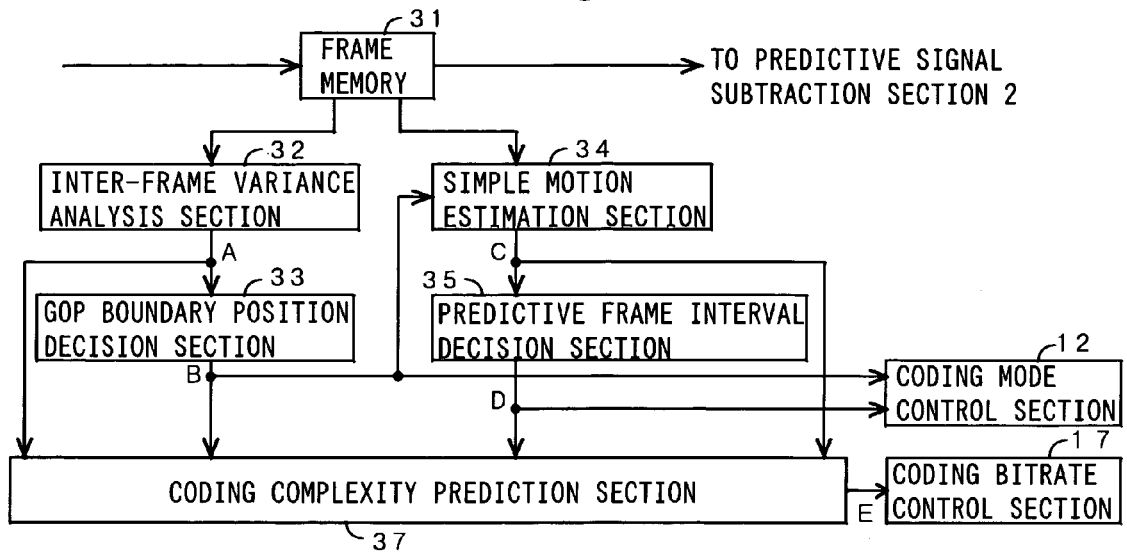
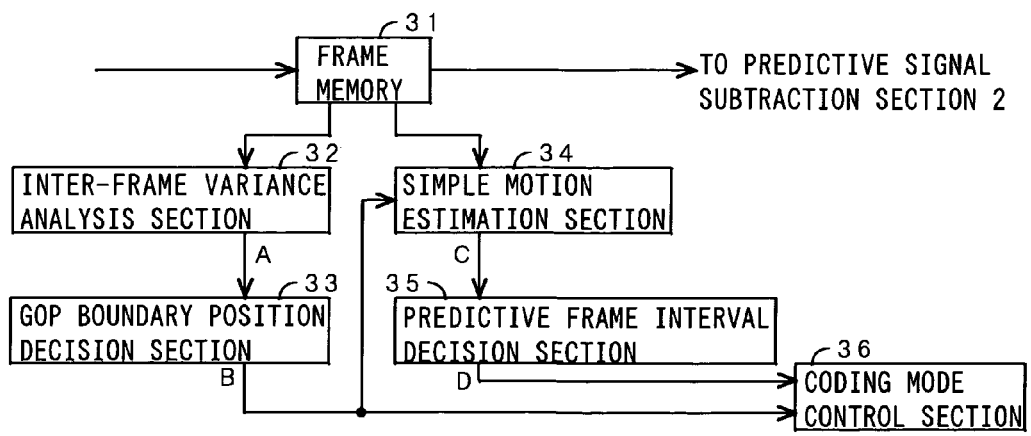

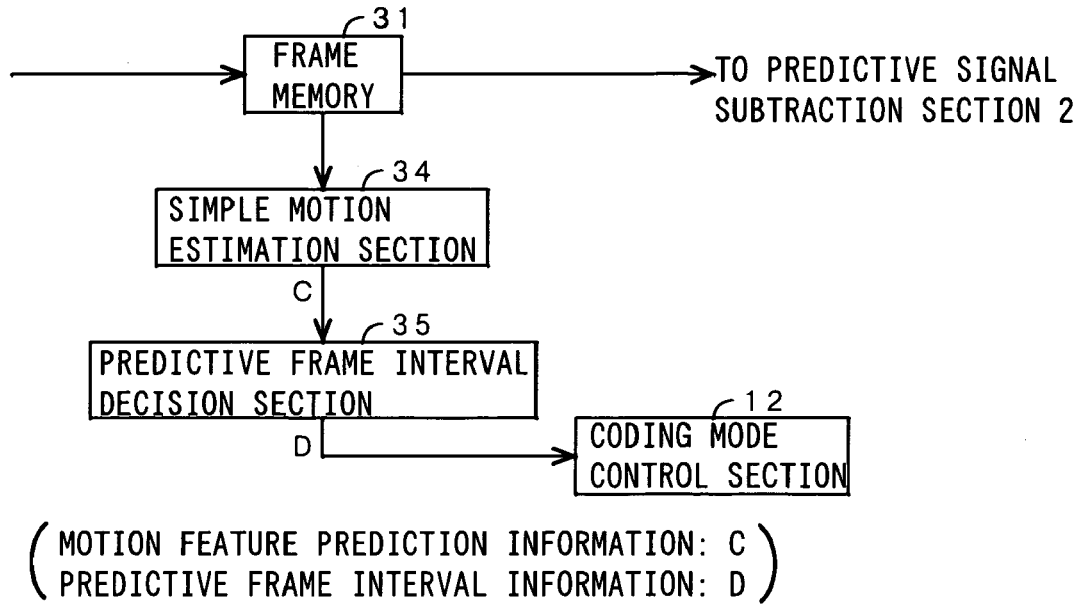
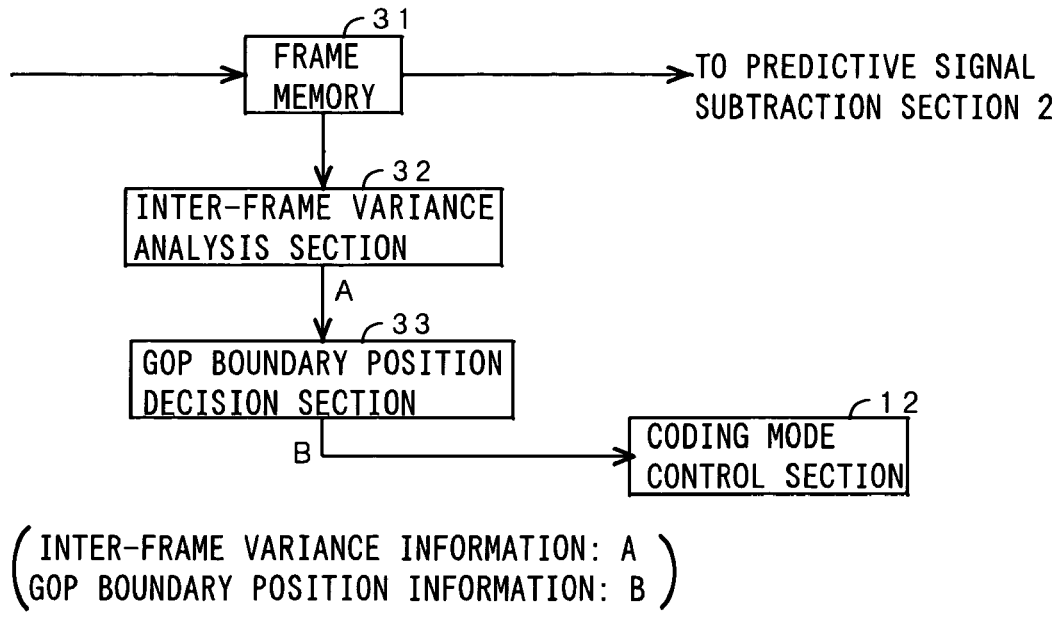

FRAME PICTURE

VIDEO CODING APPARATUS ACCORDING TO A FEATURE OF A VIDEO PICTURE

BACKGROUND OF THE INVENTION

1. Field of the Invention

The present invention relates to a video coding apparatus and, more particularly, to a video coding apparatus for performing coding by using motion compensatory prediction of a digital video signal.

2. Description of the Related Art

Among highly efficient coding systems for coding sequentially input video signals in a fewer code quantity, coding systems by the use of the motion and correlation between video pictures of video signals include motion compensatory prediction coding which decodes to reproduce a video picture coded in the past and uses motion information per small block derived from the video picture. One example of the conventional motion compensatory prediction coding is illustrated in FIG. 1.

In FIG. 1, when an input video signal 1 of a first screen is input, each of switches is controlled to be connected onto a side (1) by a coding mode control section 12, and the input video signal 1 is input directly into an orthogonal transform unit 3 in order to achieve high coding efficiency. The input video signal 1 is orthogonally transformed by using DCT (discrete cosine transform) or the like in the orthogonal transform unit 3. An orthogonal transform coefficient is quantized by a quantizer 4. The resultant quantization coefficient is converted into a variable length code such as a Huffman code by a first variable length encoder 5, and then, is input into a video duplexer 15.

In the meantime, the quantization coefficient input into an inverse quantizer 6 is inversely quantized, and then, video picture data is restored by an inverse orthogonal transform unit 7. The restored video picture data is stored in a frame memory 9. Moreover, coded data 13 transmitted from the first variable length encoder 5 and quantization information 18 transmitted from the quantizer 4 is duplexed by the video duplexer 15, to be output as a coded video data output 16.

When another input video signal 1 of a next screen is input, each of the switches is controlled to be connected to a contact on a side (2) by the coding mode control section 12, so that the input video signal 1 is input into a predictive signal subtraction section 2 and a motion compensator 10. In the motion compensator 10, a motion vector is detected based on the input video signal 1 and a reference video picture input from the frame memory 9, and then, is input into a position shifter 11 and a second variable length encoder 14. In the second variable length encoder 14, motion vector information is converted into a variable length code such as a Huffman code, thus to be input into the video duplexer 15.

In the position shifter 11, a video signal designated by the motion vector is extracted from the frame memory 9, and thereafter, is output as a motion compensatory predictive signal to the predictive signal subtraction section 2 and a local decoding addition section 8. In the predictive signal subtraction section 2, the motion compensatory predictive signal is subtracted from the input video signal 1, so that a prediction error thereof is coded. A prediction error signal is orthogonally transformed by using DCT (discrete cosine transform) or the like in the orthogonal transform unit 3 in order to achieve high coding efficiency. The signal quantized by the quantizer 4 is converted into a variable length code such as a Huffman code in the first variable length encoder 5. In order to use the same predictive signal as that on a decoding side, the quantization coefficient obtained by the quantizer 4 is inversely quantized by the inverse quantizer 6, and then, the prediction error signal is locally decoded by the inversely orthogonal transform unit 7. Furthermore, the motion compensatory predictive signal is added with the prediction error signal decoded by the local decoding addition section 8, and then, is stored in the frame memory 9.

In view of convenience of highly efficient coding and decoding reproduction, the video picture is coded by combining three kinds of video coding systems for P, B and I frames.

A minimum unit of video pictures, which are formed by combining the three kinds of video coding systems and can be decoded independently of each other, is referred to as "a GOP (a Group of Pictures)". The combination of the coding systems is referred to as "a GOP structure". A frame first coded inside one GOP is intra-frame coding (an I frame). FIG. 2 illustrates an example of a GOP. In FIG. 2, the number of frames included in one GOP is referred to as a GOP size, and an interval between P frames or between an I frame and a P frame is referred to as a predictive frame interval.

An I frame inserting interval has been conventionally constant irrespective of the feature of the input video picture: namely, the GOP size has been fixed, so that intra-frame coding has been forcibly carried out per predetermined number of frames. Consequently, the I frame has been inserted even in the case where the input video picture has the high correlation with the reference video picture and coding efficiency can be enhanced by using inter-frame prediction coding.

As for the predictive frame interval, a predictive frame interval of highest coding efficiency depends on the feature of the video picture. For example, a video picture of a swift motion can be predicted from the reference video picture with high efficiency by shortening the predictive frame interval, thus enhancing the coding efficiency. To the contrary, in the case of little variation, the predictive frame interval is prolonged, thereby enhancing the coding efficiency. However, since the predictive frame interval is fixed to about 0.1 second irrespectively of the feature of the video picture in the conventional system, the coding efficiency can not be enhanced.

Furthermore, in a video picture compression system capable of coding by either a frame structure or a field structure, there can be used either coding by "the field structure" in which one video picture to be coded is coded in a manner corresponding to one field video picture or coding by "the frame structure" in which one video picture to be coded is coded in a manner corresponding to one interlaced frame video picture. However, in the prior art, it is previously designated from the outside as to which is selected out of the frame structure and the field structure before the video picture is coded, so that the video picture to be input is coded by fixedly using the designated structure, thereby outputting coded data. That is, the coding is carried out by the fixed picture structure irrespective of the feature of the video picture.

Therefore, even in the case of coding a video picture of a swift motion in which the coding efficiency can be enhanced by adopting the field structure, the coding by the frame structure is continued if the frame structure is previously designated as the coding picture structure, resulting in degradation of the coding efficiency. To the contrary, in the case where the coding by the field structure is previously designated, the coding efficiency cannot be enhanced since the field structure is fixedly used even if the coding efficiency can be enhanced by the frame structure.

Additionally, in the case where it is not found whether the input video picture is an interlaced video picture or a non-interlaced video picture, high coding efficiency can be achieved by a 2-step system in which it is previously discriminated by some method whether or not the input video picture is an interlaced video picture, and thereafter, the picture structure is switched from the outside at the time of coding based on the discrimination information. Such a 2-step system is unavailable on the assumption of coding in real time.

SUMMARY OF THE INVENTION

The present invention has been accomplished in an attempt to solve the above problems experienced by the prior art. Therefore, an object of the present invention is to provide a video coding apparatus in which coding efficiency can be enhanced and a quality of a coded video picture can be stabilized by adaptively changing a GOP size and a predictive frame interval according to the feature of an input video picture or variations of the feature of the input video picture.

Another object of the present invention is to provide a video coding apparatus in which coding efficiency can be enhanced and a quality of a coded video picture can be stabilized by automatically discriminating whether an input video picture having no information on the feature or structure of a video picture is an interlaced input video picture or a non-interlaced input video picture and analyzing the feature of the video picture to be input, so as to adaptively change a picture structure in video picture compressing/coding to a frame structure or a field structure.

In order to achieve the above objects, the present invention has a means for detecting a variance between the video pictures based on information on sequentially input video pictures, determining the correlation between the video pictures based on the detected information, and deciding the video picture for which an intra-frame coding system is used according to the degree of the correlation.

With this characteristic, a GOP size depends on the feature of the video picture.

Furthermore, the present invention has a means for detecting a motion feature between the input video pictures so as to decide an optimum predictive frame interval.

With this characteristic, the optimum predictive frame interval can be decided based on the motion feature between the input video pictures.

Moreover, the present invention has a means for discriminating whether each of sequentially input video pictures is an interlaced video picture or a non-interlaced video picture, wherein coding by the field structure is selected if the video picture is an interlaced video picture while coding by the frame structure is selected unless the video picture is an interlaced video picture.

Additionally, the present invention calculates a variance of a video picture based on an interlaced video picture to be input so as to switch coding by the frame/field structures based on the calculation value.

With these features, it is possible to prevent any degradation of the coding efficiency caused by a variation in feature of the input video picture, which was inevitable at the time of fixed selection of the frame/field structures in the prior art. Furthermore, since the discrimination as to whether the input video picture is an interlaced video picture or a non-interlaced video picture, which need be determined before the coding, is automatically detected at the time of the coding, the efficient coding can be carried out irrespective of the feature or structure of the input video picture.

BRIEF DESCRIPTION OF THE DRAWINGS

FIG. 4 is a block diagram illustrating the configuration of a GOP structure deciding section in a first preferred embodiment according to the present invention.

FIG. 7 is a block diagram illustrating a second preferred embodiment according to the present invention.

FIG. 8 is a block diagram illustrating a third preferred embodiment according to the present invention.

FIG. 9 is a block diagram illustrating a fourth preferred embodiment according to the present invention.

DETAILED DESCRIPTION OF THE PREFERRED EMBODIMENTS

Figure 1:
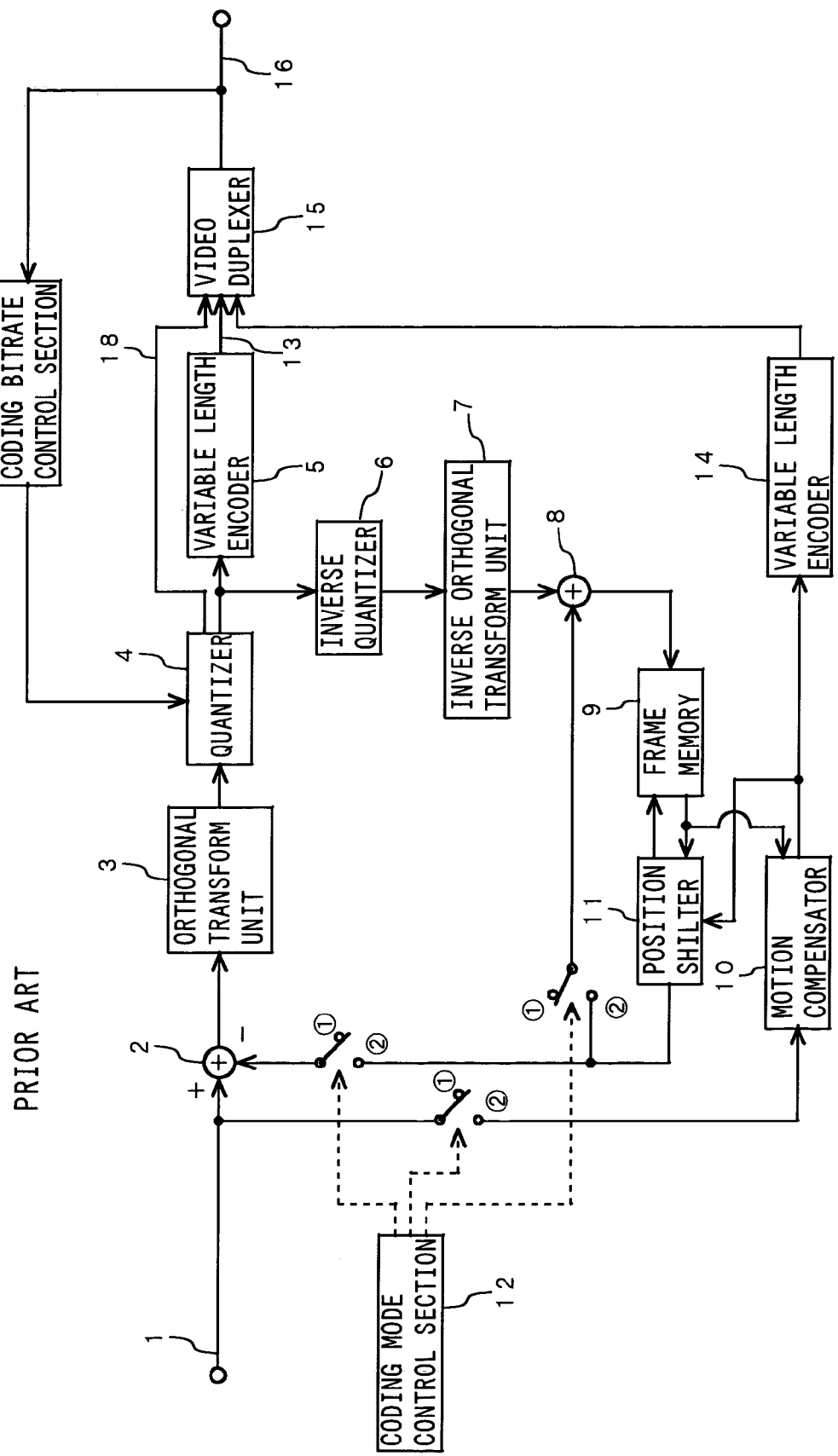
FIG. 1 is a block diagram illustrating a conventional motion compensatory prediction coding apparatus, to which the present invention is applied.
Figure 2:
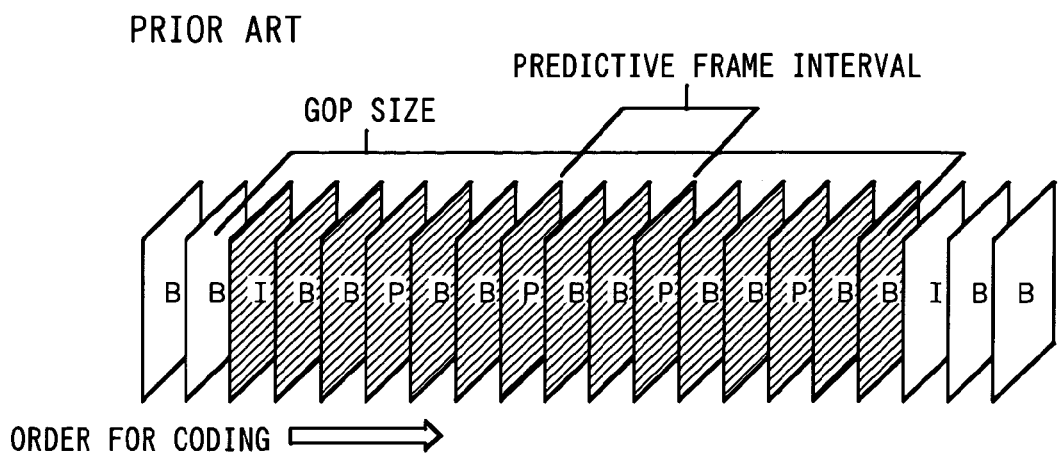
FIG. 2 is a view illustrating a conventional GOP structure.
Figure 3:
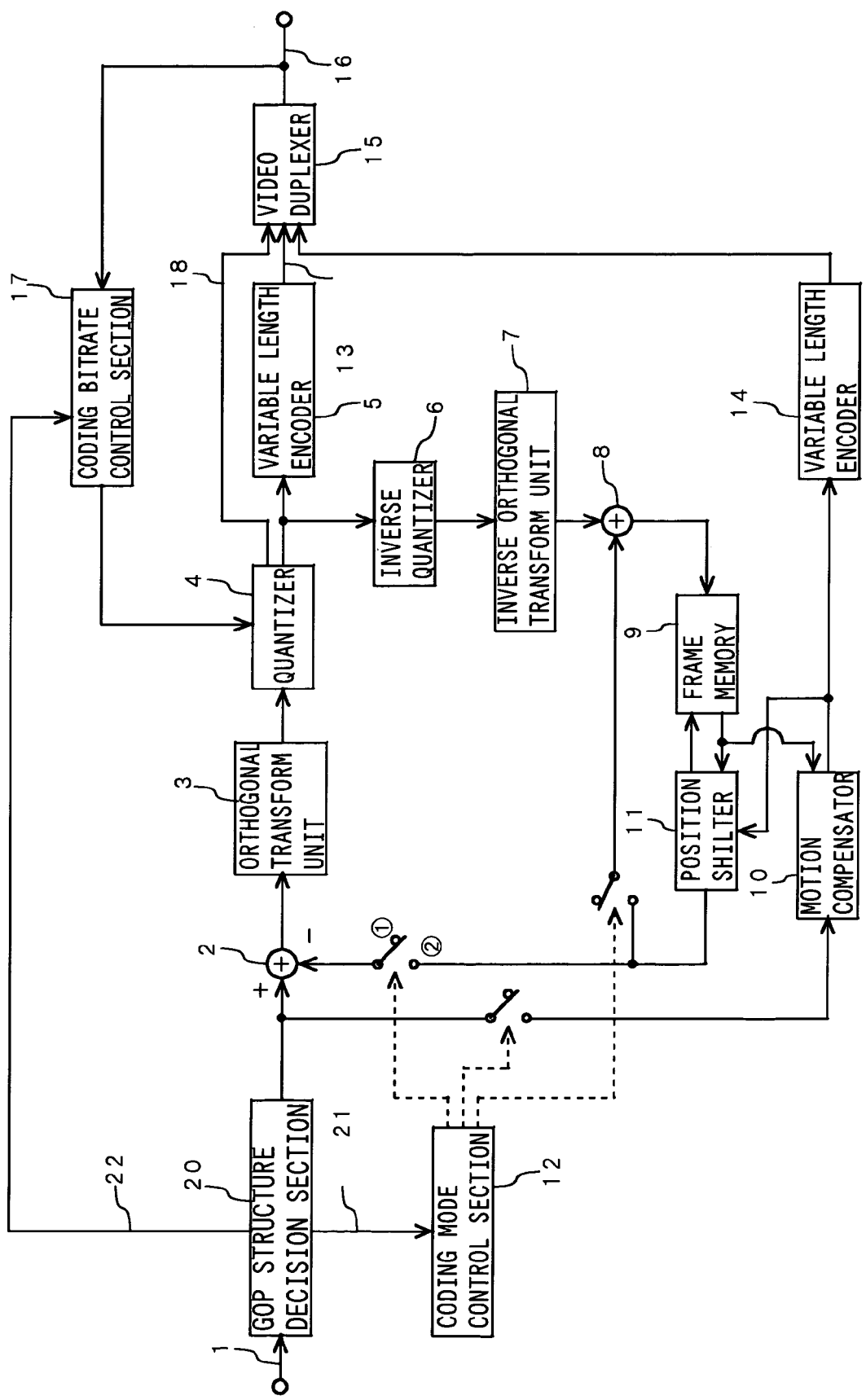
FIG. 3 is a block diagram illustrating a motion compensatory prediction coding apparatus encompassing the present invention.

The present invention will be described in detail below in reference to the drawings. FIG. 3 is a block diagram illustrating the configuration in a first preferred embodiment according to the present invention. Although the coding apparatus illustrated in FIG. 1 is used as a video picture coding system in the description below, the present invention is not limited to such a coding apparatus. The same reference numerals as those used in FIG. 1 denote like or corresponding constituent elements.

This preferred embodiment is characterized in that the features of sequentially input video signals are analyzed based on the video signals, so that a GOP structure is decided according to the features, thereby performing coding processing based on the GOP structure.

In FIG. 3, first, the features of sequentially input video signals are analyzed in a GOP structure decision section 20, which then decides a GOP structure according to the input video picture based on the features. Subsequently, when the video picture is coded, a GOP structure information signal 21 is output to a coding mode control section 12; in the meanwhile, coding complexity prediction information 22 is output to a coding bit rate control section 17. Operation other than the above-described operation is similar to that of the coding apparatus illustrated in FIG. 1, and so, its description will be omitted.

FIGS. 4, 7, 8 and 9 are block diagrams illustrating preferred processings of the GOP structure decision section 20 illustrated in FIG. 3. First of all, the processing will be explained in reference to FIG. 4 illustrating the first preferred embodiment according to the present invention. First, a frame memory 31 stores therein the sequentially input video signals. The frame memory 31 can store therein video pictures equivalent or more to the maximum GOP size.

An inter-frame variance analysis section 32 calculates a variance of a target video picture based on the video pictures stored in the frame memory 31 and a timewise immediately preceding video picture adjacent to the target video picture, and then, outputs inter-frame variance information A resulting from the calculation to a GOP boundary position decision section 33. Here, although the target video picture and the immediately preceding video picture are used for the calculation of the inter-frame variance information A, video pictures other than the immediately preceding video picture may be used.

The GOP boundary position decision section 33 decides a position optimum for a GOP boundary inside the frame memory 31 based on the inter-frame variance information A output from the inter-frame variance analysis section 32, and then, outputs the decided position as GOP boundary position information B. Upon this decision of the GOP boundary position, the video pictures prior to the decided GOP boundary position stored inside the frame memory 31 constitute one GOP.

A simple motion estimation section 34 decides a reference video picture out of the video pictures equivalent to one GOP size stored in the frame memory 31 after an I frame inserting position, i.e., after the decision of the size of one GOP by the GOP boundary position decision section 33, and then, outputs motion feature prediction information C by simple motion estimation between the reference video picture and the other video picture.

Subsequently, a predictive frame interval decision section 35 decides a predictive frame interval based on the motion feature prediction information C input from the simple motion estimation section 34, and then, outputs predictive frame interval information D.

The inter-frame variance information A, the GOP boundary position information B, the motion feature prediction information C and the predictive frame interval information D are input into a coding complexity prediction section 37, which predicts coding complexity at each of I, P and B frame coding modes so as to output the resultant information as coding complexity prediction information E to a coding bit rate control section 17.

The coding bit rate control section 17 controls a coding bit rate in coding the input video picture in consideration of the coding complexity prediction information E input from the coding complexity prediction section 37. The GOP boundary position information B and the predictive frame interval information D are output also to a coding mode control section 12, which controls switches at the time of the coding in the GOP structure decided on the basis of the information B and D.

After the decision of the structure of one GOP inside the frame memory 31, the frame memory 31 outputs a video signal to the predictive signal subtraction section 2 shown in FIG. 3 in order to code each video picture of the GOP. Information on the output video signal is erased from the frame memory 31.

Upon completion of the coding of one GOP, the frame memory 31 stores therein video pictures input in sequence posterior to the residual video pictures stored therein. When the frame memory 31 stores therein the video signals equivalent to the GOP size to the maximum, it performs the processing of deciding a next GOP structure. This processing is repeated.

Next, a description will be given in detail of the operation of each of the constituent elements illustrated in FIG. 4.

First, the frame memory 31 stores therein the sequentially input video signals. The number of video pictures to be stored is equivalent or more to the maximum GOP size which is decided at the time of the coding. The frame memory 31 outputs the video signals to the inter-frame variance analysis section 32 and the simple motion estimation section 34, respectively. When the structure of one GOP is decided in the stored video pictures, the video signal is output to the video coding apparatus. Consequently, the output video signal is erased from the frame memory 31, and then, a newly input video signal is stored in that vacant region in the frame memory 31.

Subsequently, the inter-frame variance analysis section 32 fetches two pieces of video picture information from the frame memory 31, to calculate the inter-frame variance information A. The calculating methods include a method for calculating a variance based on the intra-frame sum of absolute differences of pixel information on the two video pictures at the same position; and a method for dividing the video picture into small blocks, determining dispersion values of pixels in the small blocks, and calculating the intra-frame sum of absolute differences between frames in which the dispersion values are representative of the small blocks.

Figure 5A:
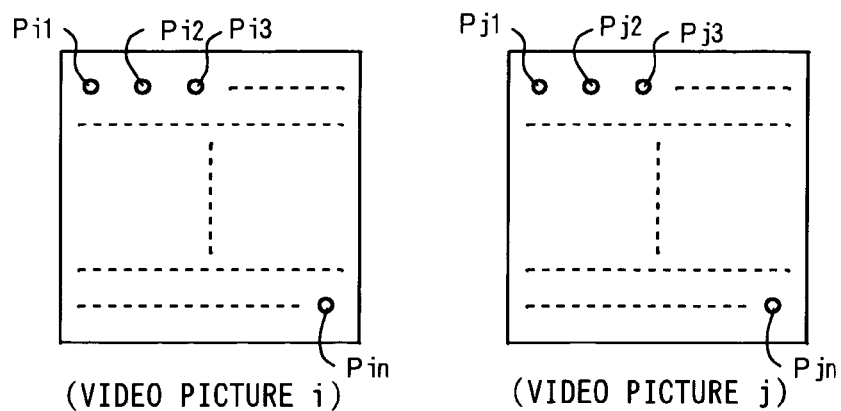
FIGS. 5A and 5B are explanatory views of a method for calculating a variance between two pixels.

In the former deciding method, as shown in, for example, FIG. 5A, assuming that pixel values of the video pictures (i) and (j) are designated by Pi1, Pi2, ..., Pin and Pj1, Pj2, ..., Pjn, respectively, the intra-frame sum A of the absolute differences is expressed by the following equation (1):

$$A = \sum_{k=1}^{n} |Pik - Pjk| \qquad (1)$$

Figure 5B:
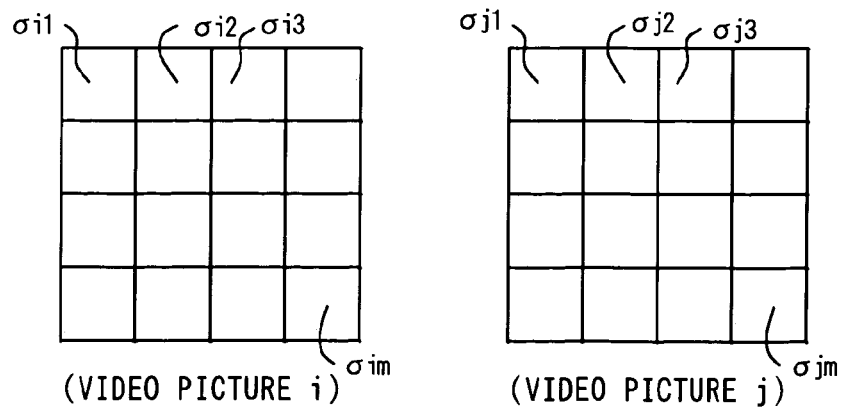

Furthermore, in the latter deciding method, as shown in, for example, FIG. 5B, assuming that dispersion values of the small blocks in the video pictures (i) and (j) are designated by σi1, σi2, ..., σim and σj1, σj2, σjm, respectively, the intra-frame sum A of the absolute differences is expressed by the following equation (2):

$$A = \sum_{k=1}^{m} |\sigma ik - \sigma jk| \qquad (2)$$

Although each of the pixel values in the decision methods is processed by using only luminance, it may be processed by using chrominance or using both luminance and chrominance. The inter-frame variance information A calculated by the inter-frame variance analysis section 32 is output to the GOP boundary position decision section 33 and the coding complexity prediction section 37.

The GOP boundary position decision section 33 decides a video picture immediately before the frame as the GOP boundary based on the inter-frame variance information A input from the inter-frame variance analysis section 32 in the case where the value of the information A exceeds a predetermined threshold value. Otherwise, the GOP boundary position decision section 33 may decide a video picture immediately before a video picture having a maximum value of the information A as the GOP boundary based on the inter-frame variance information A on all of the video pictures stored inside the frame memory 31; or it may decide it based on a logical sum or a logical product obtained by both the system using the threshold value and the system using the maximum value. The GOP boundary position information B obtained in the GOP boundary position decision section 33 is output to the simple motion estimation section 34, the coding mode control section 12 and the coding complexity prediction section 37.

After one GOP size with respect to the video pictures inside the frame memory 31 is decided in the GOP boundary position decision section 33, the simple motion estimation section 34 performs simple motion estimation processing in order to predict motion information on the video picture inside the GOP. In a method for collecting most accurate motion information, the input video picture is divided into small blocks each composed of 8×8 pixels or 16×16 pixels, each of the small blocks is subjected to motion estimation, and consequently, the most accurate motion information is determined based on the resultant motion information on each of the small blocks in the same manner as the motion estimation processing by the motion compensator 10 in the video coding apparatus for the video pictures illustrated in FIG. 3. However, since a processing quantity required for the motion estimation is huge, addition processing of $2^{31}$ times or more is required for the motion estimation processing of one video picture in the case where, for example, the video picture size is 720×480 pixels and the motion estimation falls within the range of ±16 pixels. As a consequence, the present invention uses the means for predicting the motion information on the video picture based on the information resulting from the simple motion estimation processing of a small processing quantity performed in the simple motion estimation section 34. Description will be given below of the simple motion estimation processing.

First, one video picture decided inside the GOP is selected as a reference video picture. Thereafter, the reference video picture is divided into small blocks. Subsequently, a downscaled video picture, in which the small block is expressed by one representative value, is created. Here, the dispersion of all of the pixel values inside the small block, for example, can be used for calculation of the representative value. The oldest video picture out of the target GOP is selected as the reference video picture, but other video pictures may be selected.

Next, in order to grasp the motion features in comparison with the reference video picture, the target video pictures are determined, and then, the downscaled video pictures of these video pictures are created. Thereafter, the motion estimation processing is performed by the use of the downscaled video pictures of both of the reference video picture and the target video picture. Although according to the present invention, the motion estimation processing is performed with respect to all of the video pictures except the reference video picture inside the GOP, not all of the video pictures but some selected video pictures may be subjected to the motion estimation processing.

Figure 6:
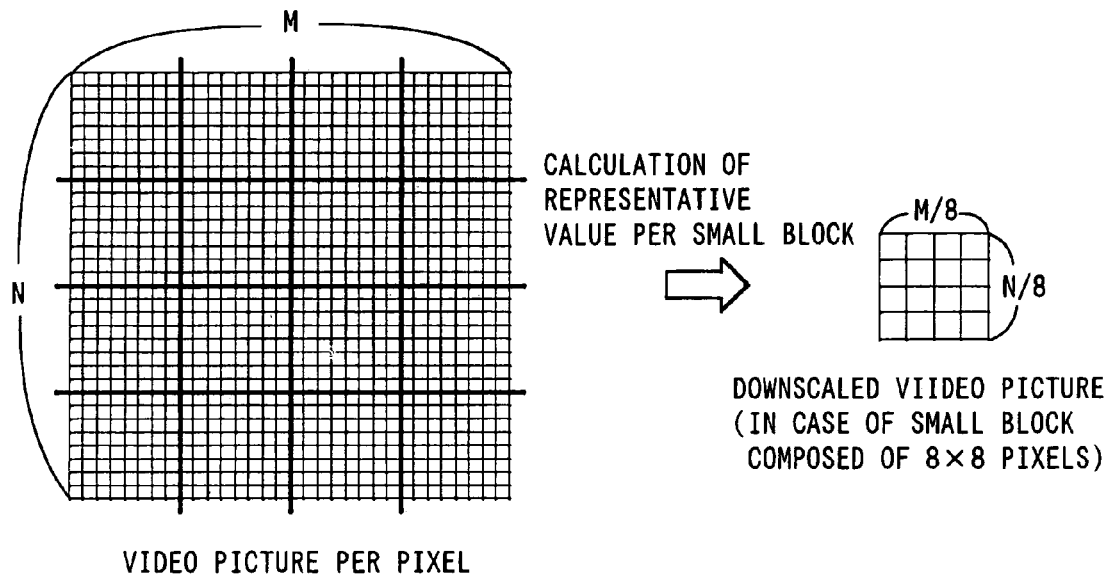
FIG. 6 is a view explanatory of creation of a downscaled video picture for the purpose of simple motion estimation.

FIG. 6 illustrates a method for creating the downscaled video picture. Assuming that a video picture to be input is composed of M pixels in a horizontal direction multiplied by N pixels in a vertical direction and a small block is composed of 8 pixels in the horizontal and vertical directions, respectively, a representative value of the small block is one with respect to 64 pixels, so that a downscaled video picture to be created is composed of M/8 in the horizontal direction multiplied by N/8 in the vertical direction in the case where N and M each are a multiple of 8. Furthermore, the size of the small block may be processed not in the size of 8×8 pixels, but in the size of 16×16 pixels or in the sizes of all other rectangular blocks.

Although the dispersion value of each of the pixel values inside the small block is used for the calculation of the representative value per small block in this system, an average value, a standard deviation, an absolute error sum with respect to the average value or combinations thereof may be used. Although a luminance is used herein as the pixel value, a luminance and/or a chrominance may be used.

The motion estimation is generally performed per small block, so that a vector indicating a position of a smallest difference is calculated, thereby obtaining the motion feature. However, accuracy of the motion vector information is low since the downscaled video picture is used in this system. Consequently, the smallest motion compensatory prediction error at the time of the motion estimation based on the downscaled video picture information is a motion feature value of the video picture, i.e., the motion feature prediction information C as an index of the magnitude of the motion of the entire video picture. A square error, an absolute error, an absolute error at a square root may be used for the calculation of the motion compensatory prediction error.

The obtained motion compensatory prediction error as the motion feature prediction information C is input into the predictive frame interval decision section 35, which decides a predictive frame interval based on the motion feature prediction information C. The predictive frame interval is small in the case where a motion or a variation between the video pictures is great in coding the video pictures; to the contrary, the predictive frame interval is large in the case where a motion or a variation between the video pictures is small in coding the video pictures, thereby achieving most efficient coding. Consequently, in order to grasp the motion feature over one GOP, the motion feature prediction information C on all of the reference video picture and other video pictures inside one GOP is obtained, and then, the average value thereof is obtained. The average value is used as a representative value, on the basis of which the predictive frame interval is determined. One of the characteristics of the present invention resides in that the inversely proportional relationship is established between the predictive frame interval and the obtained average value. Besides the method for using the average value, a maximum value or a minimum value may be used for the calculation of the representative value inside one GOP.

Since a relative motion quantity with respect to a pixel becomes large in the case where the resolution of the video picture to be input is high, the inversely proportional relationship is established between the resolution of the video picture and an optimum predictive frame interval. Another characteristic of the present invention resides in that the inversely proportional relationship with respect to the resolution information on the video picture is considered in deciding the predictive frame interval. The decided predictive frame interval information D is output to the coding complexity prediction section 37 and the coding mode control section 12. The GOP boundary position information B and the predictive frame interval information D are transmitted together to the coding mode control section 12, in which the switches are controlled based on the information B and D in coding the video pictures.

The inter-frame variance information A, the GOP boundary position information B, the motion feature prediction information C and the predictive frame interval information D are input into the coding complexity prediction section 37, which calculates coding complexity prediction information E as an index of generated code quantity prediction in coding at a coding mode of each of the I, P and B frames, and then, outputs the coding complexity prediction information E to the coding bit rate control section 17.

When the processing proceeds to coding of a new GOP, the coding bit rate control section 17 renews coding complexity prediction information at each of the coding modes based on the coding complexity prediction information E input from the coding complexity prediction section 37. Coding complexity prediction information used at past frames having the same coding mode has been conventionally used irrespectively of switching of the input video picture or fluctuations. Consequently, in the case where an input video picture has suffered from a large change such as a change in scene, the video picture has been influenced by coding complexity prediction information on a frame having no correlation, with an attendant problem of markedly degradation of a quality of the video picture. However, since the prediction is carried out based on the information of the video picture to be coded according to the present invention, the above-described problem can be solved.

Subsequently, explanation will be made on a method for calculating the coding complexity prediction information E at each of the coding modes. A video picture which is coded as an I frame is divided into small blocks and the dispersion of a pixel value per small block is decided, so that the coding complexity prediction information E at the I frame is calculated by a product of an intra-frame average of the dispersions multiplied by a fixed value SI as a scaling parameter. Luminance information and/or chrominance information may be used as the pixel value.

In the case where an absolute difference calculated between the dispersion of the pixel value per small block and dispersion of a pixel value of an adjacent small block exceeds a threshold value, it is judged that the small block region of the input video picture includes edge information such as an outline, so that the coding bit rate control section 17 takes the judgement into consideration so as to assign many coding quantities in coding the small block region.

An average of the motion compensatory prediction errors is obtained based on all of the motion feature prediction information C inside the target GOP, and then, the coding complexity prediction information E at the P frame is calculated by a product of the average value multiplied by a fixed value SP as a scaling parameter. Otherwise, the coding complexity prediction information E at the I frame may be scaled for the calculation.

The coding complexity prediction information E at the B frame is calculated by a product of the coding complexity prediction information at the P frame multiplied by a fixed value SB as a scaling parameter.

Subsequently, a second embodiment according to the present invention is illustrated in FIG. 7. The present embodiment is configured such that the processing of the coding complexity prediction section 37 in the first embodiment illustrated in FIG. 4 is omitted.

Next, a third embodiment according to the present invention is illustrated in FIG. 8. The present embodiment is configured such that the processing concerned in the decision of the GOP size in the second embodiment illustrated in FIG. 7 is omitted. In the present embodiment, a GOP size is fixed with a length designated in advance. In each GOP, an optimum predictive frame interval is adaptively varied based on motion feature prediction information C.

Subsequently, a fourth embodiment according to the present invention is illustrated in FIG. 9. The present embodiment is configured such that the processing concerned in the decision of the predictive frame interval in the second embodiment illustrated in FIG. 7 is omitted. In the present embodiment, the predictive frame interval is fixedly designated in advance. Only a GOP size is adaptively varied based on inter-frame variance information A which is a feature of an input video picture.

As is obvious from the above description, since according to the present invention the GOP size is decided according to the feature or variation of the input video picture, the GOP size can be decided in a manner adaptive to the variation of the input video picture. Therefore, it is possible to avoid degradation of the coding efficiency or fluctuation of a quality of the video picture which may occur in the case of coding with the fixed GOP size.

Moreover, since the motion feature of the video picture inside the GOP can be detected based on the decided GOP size and the predictive frame interval according to the motion feature can be set, the predictive frame interval can be taken according to the motion feature of the input video picture. Consequently, it is possible to enhance the coding efficiency more than the case of the conventional coding at the fixed predictive frame interval.

Additionally, the coding complexity prediction information used in the preceding GOP has been considered even in the case where there has been no correlation in video picture feature between a preceding GOP and a target GOP due to a scene change or the like in the prior art, thereby inducing markedly fluctuations or deterioration of a quality of the video picture to be coded or degradation of the coding efficiency. In contrast, according to the present invention, the coding complexity prediction information is calculated based on the features of the video pictures inside the target GOP after the completion of the coding of one GOP and before coding of a next GOP, so that a video picture can be coded with a stable quality without any influence of the feature of the video picture inside an irrelevant GOP.

Figure 10:
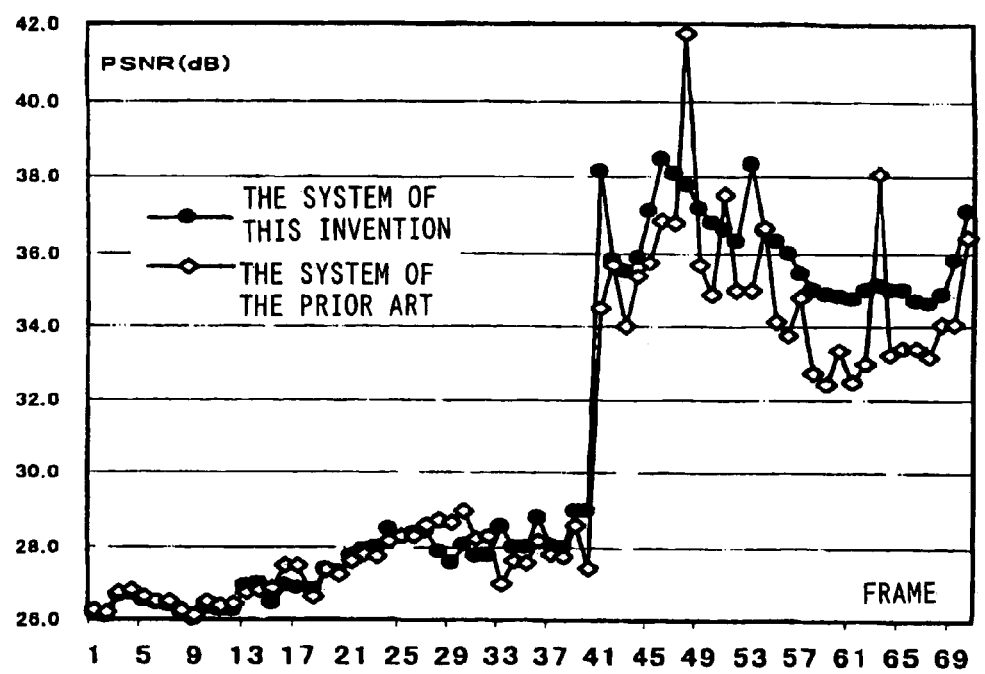
FIG. 10 is a graph illustrating simulation results according to the present invention.

FIG. 10 shows the simulation result on a video picture with a change in scene in the MPEG2 system. In this simulation, under the condition where compression coding was carried out at a coding rate of 4 Mbit/s, fluctuation of PSNR was small and the quality of the video picture could be improved by 0.65 dB according to the present invention in comparison with the coding in the prior art in which the GOP size was fixed to 15 frames and the predictive frame interval was fixed to 3 frames.

Next, a fifth embodiment according to the present invention will be explained in reference to FIG. 11. In the present embodiment, it is discriminated based on each of sequentially input video signals (stationary video signals) whether or not an input video picture is an interlaced video picture. If the input video picture is an interlaced video picture, a downscaled feature plane is created, and then, coding in a frame/field structure is decided based on the result of simple motion estimation processing by the use of the downscaled feature plane.

Figure 11:
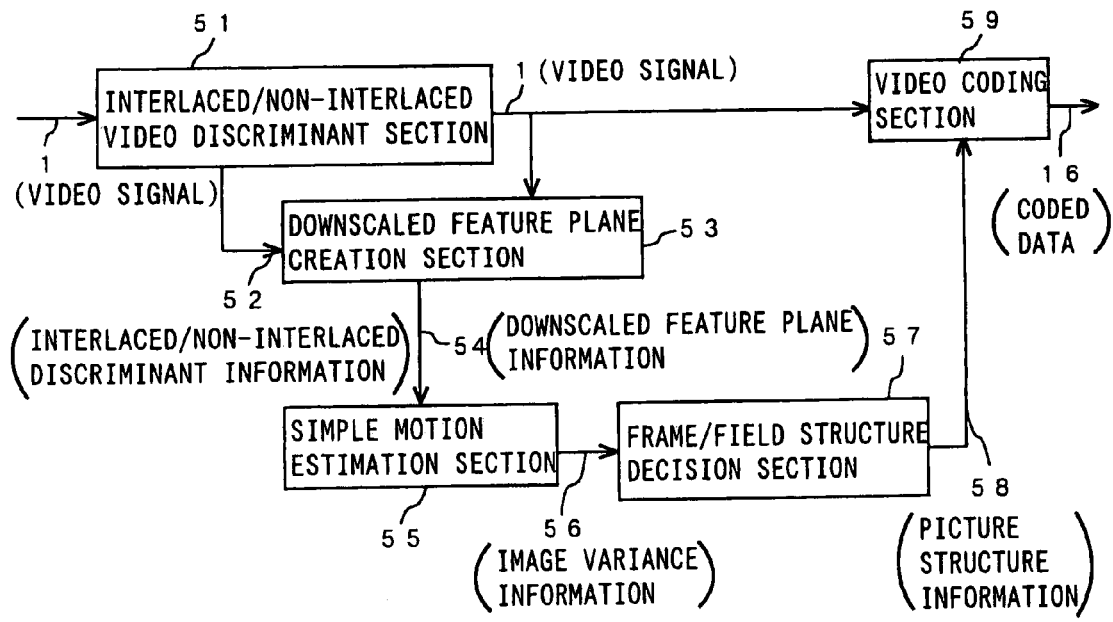
FIG. 11 is a block diagram illustrating the configuration in a fifth preferred embodiment according to the present invention.

In FIG. 11, an interlaced/non-interlaced video discriminant section 51 discriminates whether each of sequentially input video signals 1 is an interlaced video signal or a non-interlaced video signal. The discrimination result is output as interlaced/non-interlaced discriminant information 52 to a downscaled feature plane creation section 53. The downscaled feature plane creation section 53 creates downscaled feature plane information 54 in consideration of the feature of the video picture with respect to the video picture which is discriminated as the interlaced video picture in the interlaced/non-interlaced video discriminant section 51, and outputs the downscaled feature plane information 54 to a simple motion estimation section 55. The simple motion estimation section 55 performs simple motion estimation processing between two downscaled feature planes, and outputs the resultant motion compensatory prediction error as image variance information 56 to a frame/field structure decision section 57.

Based on the image variance information 56 obtained by the simple motion estimation section 55, the frame/field structure decision section 57 decides coding by the frame structure in the case of a small variance while coding by the field structure in the case of a large variance, and outputs the result as picture structure information 58 to a video coding section 59. The video coding section 59 performs video coding with respect to the input video signal 1 in response to picture structure information 58 indicated by the frame/field structure decision section 57, and outputs coded data 16. Here, the video coding section 59 switches the operations of, for example, the motion compensator 10, the first variable length encoder 5 and the second variable length encoder 14, illustrated in FIG. 1, to the operation adaptive to coding in the frame/field structure according to the designation of the frame/field structure based on the picture structure information 58.

Figure 12:
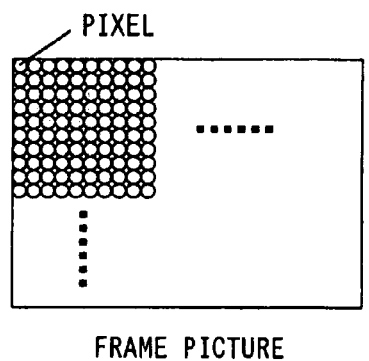
FIG. 12 is a view illustrating the configuration of a frame video picture.
Figure 13:
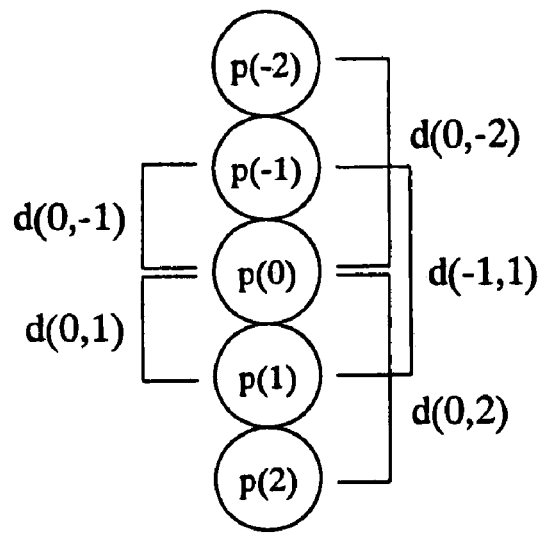
FIG. 13 is a view explanatory of a pixel for calculating an absolute difference.

Next, description will be given of one example of the configuration and operation of each of the constituent elements in FIG. 11. First, explanation will be made on the interlaced/non-interlaced video discriminant section 51. The discrimination as to whether or not the video picture is an interlaced video picture is decided by the calculation with some adjacent pixels based on the video picture information to be input. FIG. 12 illustrates the configuration of frame video information to be input. The video information is composed of the array of spacewise uniformly arranged pixels. Based on the video information, five pixel values continuous in a vertical direction at an arbitrary position are taken, and then, an absolute difference between two pixels is calculated, as illustrated in FIG. 13.

There are calculated absolute differences between pixels belonging to the same fields of 0 and −2, 0 and 2, and −1 and 1 in five pixels p(−2) to p(2), wherein a pixel positioned at the center in the vertical direction is designated by p(0), and absolute differences between pixels belonging to different fields of 0 and −1, and 0 and 1. It is verified whether or not the condition expressed by inequality (3) below is satisfied:

$$\text{Max}(d(0,-2),d(0,2),d(-1,1)) < \text{threshold value} \quad (3)$$

Subsequently, if the condition expressed by inequality (3) above is satisfied, it is further verified whether or not the condition expressed by inequality (4) below is satisfied:

$$(\text{Max}(d(0,-2),d(0,2),d(-1,1))+\text{offset}) < \text{Min}(d(0,-1),d(0,1)) \quad (4)$$

Here, d(a,b) represents an absolute difference between a and b; Max(a,b,c), a maximum value of a, b and c; and Min(a,b,c), a minimum value of a, b and c. That is, in the case where the pixel values belonging to the same field are similar to each other and the maximum absolute difference is less than the threshold value (a fixed value), it is verified whether or not the minimum value of the absolute differences at the different fields exceeds a value obtained by adding an offset (a fixed value) to the maximum absolute difference at the same field. This processing is performed with respect to all of the pixels or the arbitrary number of positions inside the video picture. In the case where the points satisfying inequalities (3) and (4) exceed a predetermined rate of the points satisfying inequality (3), the video picture is discriminated as an interlaced video picture, and then, the result is output as the interlaced/non-interlaced discriminant information 52 per frame to the downscaled feature plane creation section 53.

Furthermore, although the description has been given of the example in which the discrimination of the interlaced/non-interlaced video picture is performed by the use of the five pixels in the vertical direction, the number of pixels required for the verification is arbitrary as long as it is three or more wherein comparison can be conducted between adjacent pixels at the same field and pixels at different fields. Moreover, the position of the pixel to be verified may be any of all of the pixels inside the video picture. Otherwise, a sample point may be investigated such that the above-described verification is conducted at a specific position or an arbitrary position inside one block composed of, for example, five pixels in the vertical direction and n pixels in the horizontal direction. Alternatively, utterly arbitrary points may be spot-checked at random.

Figure 14:
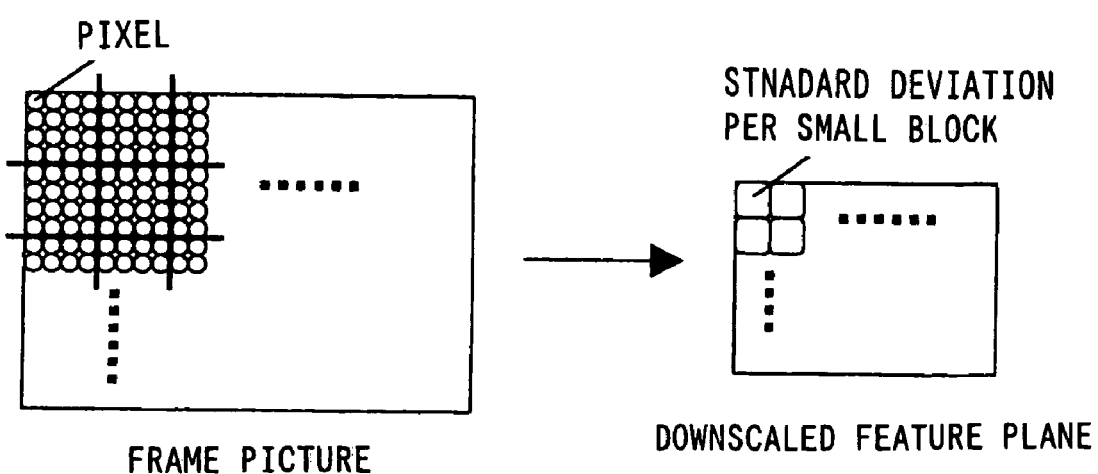
FIG. 14 is a view explanatory of creation of a downscaled feature plane.

Subsequently, explanation will be made on the processing of the downscaled feature plane creation section 53 illustrated in FIG. 11, i.e., the processing of creating a downscaled plane in consideration of the feature of the video picture based on an original video picture in reference to FIG. 14. First, the original video picture is divided into small blocks, each of which is expressed by a representative value. According to the present invention, the standard deviation of the pixel values per small block is used as the representative value. An average value or a median value may be used as the representative value. A luminance component of the pixel may be used as the pixel value at the time of the calculation; or, other components or an average thereof may be used. Furthermore, the size of the small block may be arbitrarily set. Assuming that the small block is composed of ph pixels in the horizontal direction multiplied by pv pixels in the vertical direction, the downscaled feature plane is composed of H/ph pixels in the horizontal direction multiplied by V/pv pixels in the vertical direction with respect to the size of the original video picture (H pixels in the horizontal direction multiplied by V pixels in the vertical direction), so that the number of samples becomes 1/(ph×pv) with respect to the number of pixels of the original video picture. The downscaled plane having the standard deviation of the small block as the representative value is the downscaled feature plane information 54.

Next, description will be given below of the processing by the simple motion estimation section 55 illustrated in FIG.

11. The simple motion estimation section 55 performs the motion estimation processing between the two downscaled feature planes based on the downscaled feature plane information 54 created by the downscaled feature plane creation section 53. A timewise distance between a reference plane and a target plane to be subjected to the simple motion estimation is an arbitrarily fixed value. Motion estimation by block matching or the like can be used in the motion estimating method. In this case, the block can take an arbitrary natural number for both of horizontal and vertical sizes on the downscaled feature plane. Consequently, the motion estimation per block can be carried out by using, as one block, one sample at the minimum or the entirety of one downscaled feature plane at the maximum.

Figure 15:
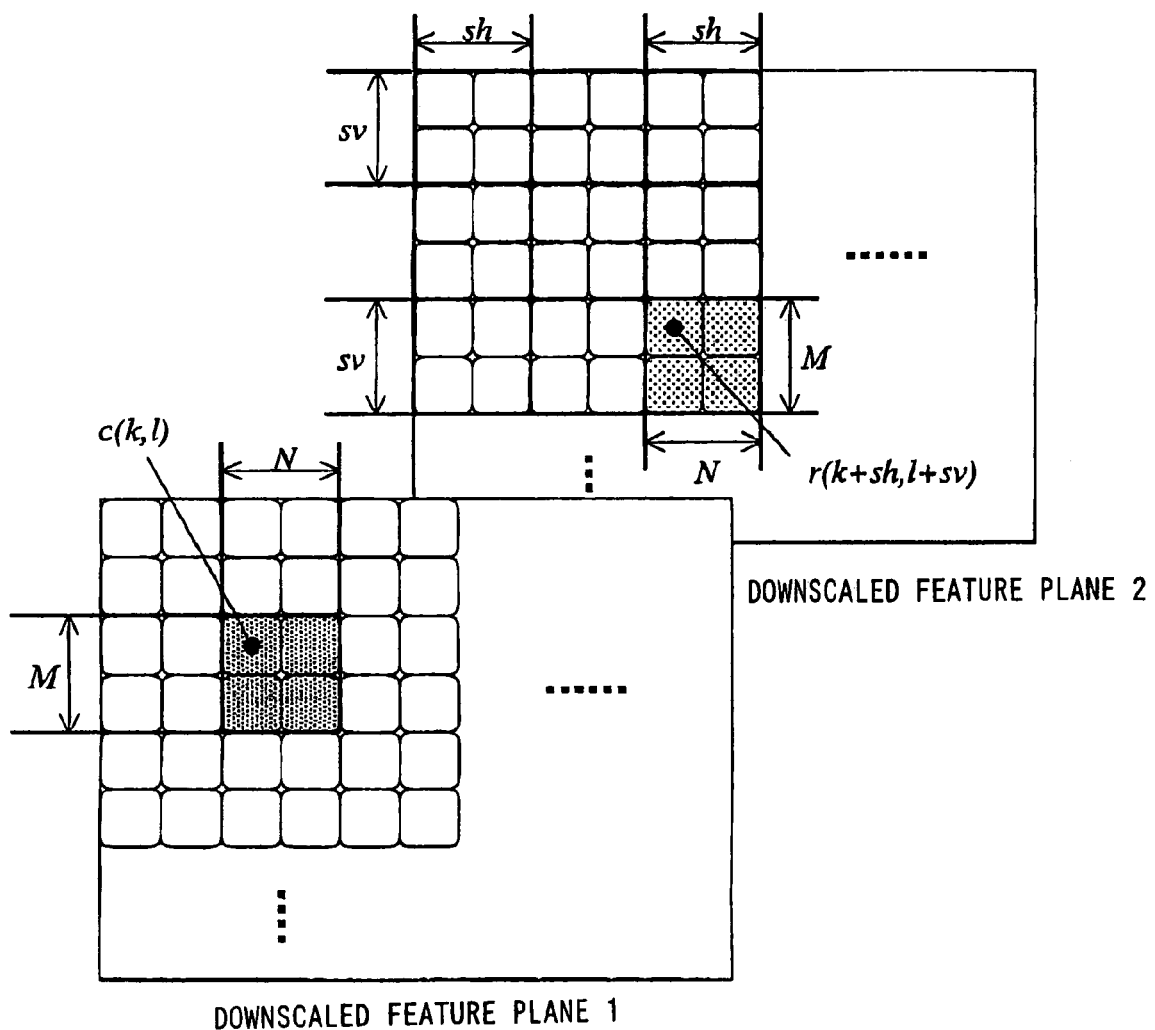
FIG. 15 is a view explanatory of processing of the simple motion estimation.

Referring to FIG. 15, explanation will be made below. An upper left coordinate of the set block is designated by (k,l); an element on a downscaled feature plane 1, c(k,l); and an element on a downscaled feature plane 2, r(k,l). Reference character N represents the size of the block in the horizontal direction; and M, the size of the block in the vertical direction. The estimation range falls within ±sh in the horizontal direction and ±sv in the vertical direction. An average motion compensatory prediction error E(k,l) of one element in this simple motion estimation is determined based on the minimum error within the estimation range according to the following equations (5) and (6):

$$E(k, l) = \text{Min} (\text{Err}(k, l, h, v)) \quad (5)$$

here, $$Err(k, l, h, v) = \sum_{m=0}^{M-1} \sum_{n=0}^{N-1} |c(k+m, l+n) - r((k+m+h), (l+n+v))| \quad (6)$$

$$(-sh \leq h \leq sh, -sv \leq v \leq sv)$$

As to the prediction error E(k,l), square root processing may be performed after determination of a square error, or an absolute difference may used. The prediction error E(k,l) obtained by the simple motion estimation processing is determined with respect to all of the blocks on the downscaled feature plane 1, thereby obtaining the sum Esum on the downscaled feature plane 1. The sum Esum is an index indicating the magnitude of a variation between two video pictures. The sum Esum as the image variance information 56 is output to the frame/field structure decision section 57.

Next, the frame/field structure decision section 57 illustrated in FIG. 11 judges whether or not the image variance information 56 per input frame exceeds a threshold value. If the image variance information 56 per input frame is the threshold value or more, the frame/field structure decision section 57 decides the field structure; to the contrary, if the image variance information 56 per input frame is less than the threshold value, the frame/field structure decision section 57 decides the frame structure. Thereafter, the frame/field structure decision section 57 outputs the decision result as the picture structure information 58 to the video coding section 59.

The video coding section 59 illustrated in FIG. 11 performs the compression coding of the video signal to be input by the use of the picture structure designated by the picture structure information 58 output from the frame/field structure decision section 57, and then, outputs the coded data 16. Specifically, the video coding section 59 switches, for example, the operations of the motion compensator 10, the first variable length encoder 5 and the second variable length encoder 14 illustrated in FIG. 1 to the system adaptive to coding in the frame/field structure according to the picture structure.

Figure 16:
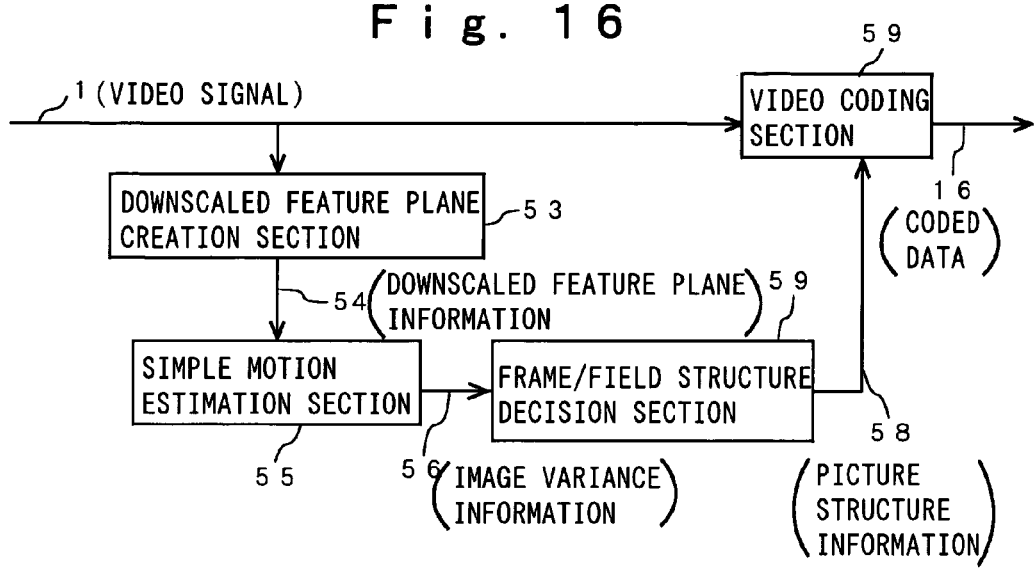
FIG. 16 is a block diagram illustrating the configuration in a sixth preferred embodiment according to the present invention.

FIG. 16 is a block diagram illustrating the configuration of a sixth embodiment according to the present invention. The same reference numerals as those in FIG. 11 designate like or corresponding constituent elements. In the present embodiment, a video coding apparatus comprises a downscaled feature plane creation section 53, a simple motion estimation section 55 and a frame/field structure decision section 57. The present embodiment is characterized in that the frame/field structure decision section 57 selects coding by a field structure if image variance information 56 obtained by simple motion estimation processing in the simple motion estimation section 55 exceeds a certain threshold value; in the meantime, it selects coding by a frame structure if the image variance information 56 is less than the threshold value. There is a difference between the fifth embodiment illustrated in FIG. 11 and the present embodiment in that in the former embodiment the downscaled feature plane creation section 53 creates the downscaled feature plane in the case of the interlaced video picture, while in the latter the downscaled feature plane creation section 53 creates the downscaled feature plane also in the case of a non-interlaced video picture.

Figure 17:
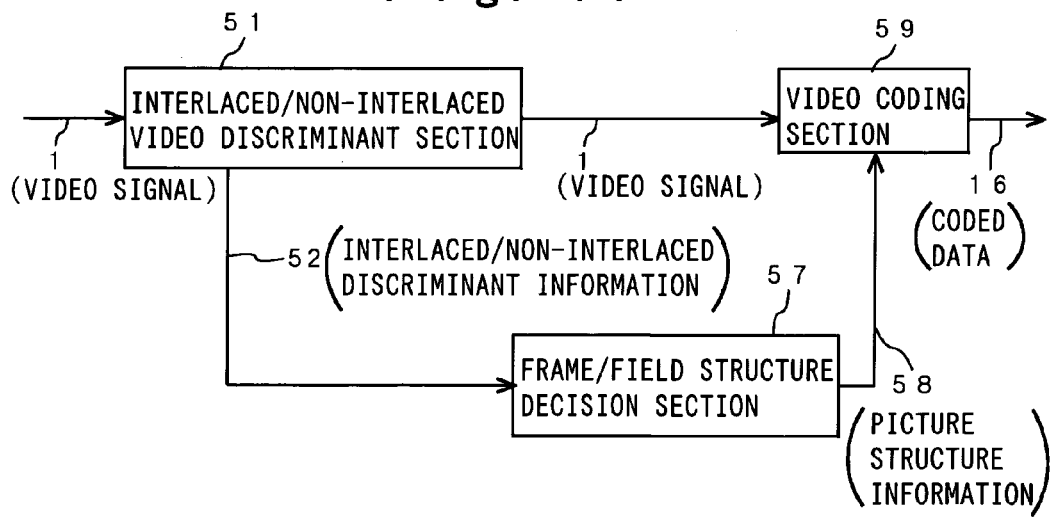
FIG. 17 is a block diagram illustrating the configuration in a seventh preferred embodiment according to the present invention.

FIG. 17 is a block diagram illustrating the configuration of a seventh embodiment according to the present invention. The same reference numerals as those in FIG. 11 designate like or corresponding constituent elements. In the present embodiment, a video coding apparatus comprises an interlaced/non-interlaced video discriminant section 51 and a frame/field structure decision section 57. The interlaced/non-interlaced video discriminant section 51 discriminates whether or not an input video picture is an interlaced video picture. The present embodiment is characterized in that the frame/field structure decision section 57 selects coding by a field structure in the case where the input video picture is an interlaced video picture; to the contrary, it selects coding by a frame structure in the case where the input video picture is a non-interlaced video picture.

Figure 18:
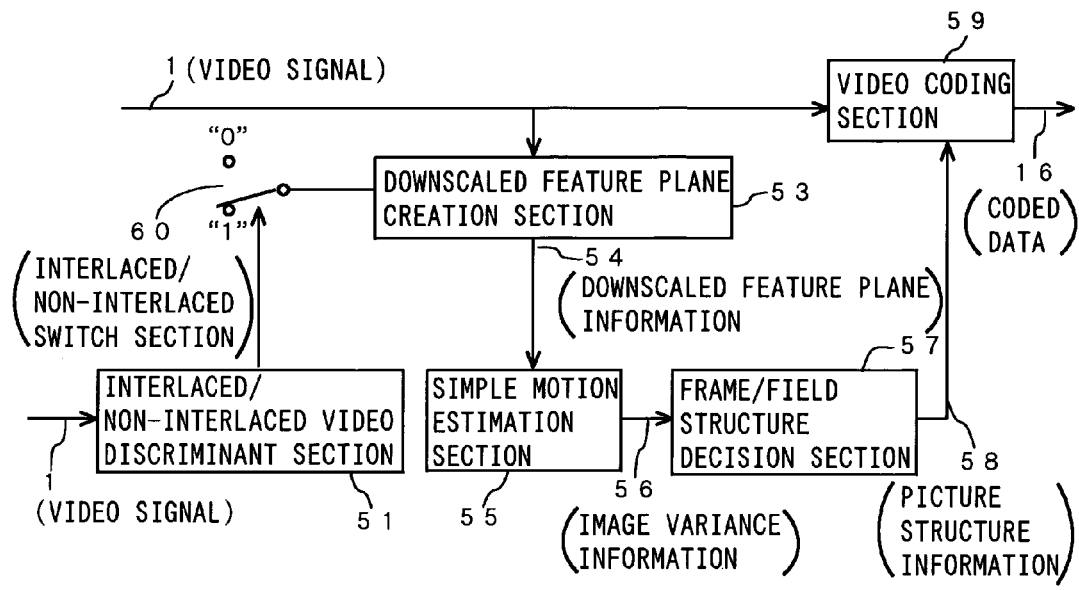
FIG. 18 is a block diagram illustrating the configuration in an eighth preferred embodiment according to the present invention.

FIG. 18 is a block diagram illustrating the configuration of an eighth embodiment according to the present invention. The same reference numerals as those in FIG. 11 designate like or corresponding constituent elements. In the present embodiment, a video coding apparatus comprises an interlaced/non-interlaced video discriminant section 51, an interlaced/non-interlaced video switch section 60, a downscaled feature plane creation section 53, a simple motion estimation section 55 and a frame/field structure decision section 57. The interlaced/non-interlaced video discriminant section 51 discriminates whether one video picture input first or a plurality of video pictures are interlaced or non-interlaced video pictures. Based on the discrimination, the interlaced/non-interlaced switch section 60 switches "0" and "1". As for video pictures input hereafter, the interlaced/non-interlaced video discriminant section 51 does not perform discrimination of interlaced or non-interlaced video pictures. The present embodiment is different in the above-described point from the fifth embodiment illustrated in FIG. 11.

Figure 19:
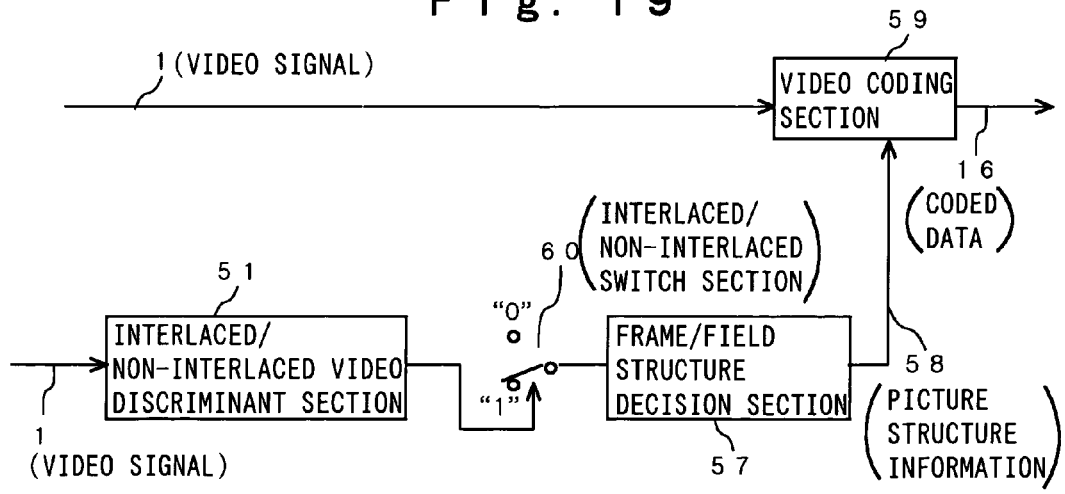
FIG. 19 a block diagram illustrating the configuration in a ninth preferred embodiment according to the present invention.

FIG. 19 is a block diagram illustrating the configuration of a ninth embodiment according to the present invention. The same reference numerals as those in FIG. 11 designate like or corresponding constituent elements. In the present embodiment, a video coding apparatus comprises an interlaced/non-interlaced video discriminant section 51, an interlaced/non-interlaced video switch section 60 and a frame/ field structure decision section 57. The interlaced/non-interlaced video discriminant section 51 discriminates whether one video picture input first or a plurality of video pictures are interlaced or non-interlaced video pictures. Based on the discrimination, the interlaced/non-interlaced switch section 60 switches "0" and "1". As for video pictures input hereafter, the interlaced/non-interlaced video discriminant section 51 does not perform discrimination of interlaced or non-interlaced video pictures. The present embodiment is different in the above-described point from the seventh embodiment illustrated in FIG. 17.

As is obvious from the above description, although the video picture having an improved coding efficiency is limited in the conventional coding by the fixed picture structure, since the coding is selected depending on the picture structure according to the feature or variation of the input video picture according to the present invention, a high coding efficiency can be maintained even if a video picture having any feature is input or the feature of the video picture is varied on the way.

Furthermore, the video coding simulation is conducted by using the MPEG2 video coding system as the video coding system in which the motion compensatory prediction coding can be carried out by either the frame structure or the field structure. As a result, the quality of the video picture can be improved by about 0.4 dB to 1.0 dB of PSNR according to the present invention in comparison with the case of the fixation in the frame structure under the condition of the compression coding at a coding rate of 4 Mbit/s.

What is claimed is:

1. A video coding apparatus for coding a video picture by the use of motion compensatory prediction of each of video pictures with respect to sequentially input video signals, the video coding apparatus comprising:

inter-frame variance calculation means for calculating a variance between timewise adjacent frames with respect to the input video signals;

intra-frame coding mode decision means for deciding a GOP boundary position when the inter-frame variance exceeds a predetermined value; and one-way coding (P) frame interval decision means for deciding a P frame interval for carrying out motion compensatory prediction coding based on the motion features between time wise adjacent frames with respect to the input video pictures, wherein the P frame interval inside one GOP being decided based on the decision by the P frame interval decision means.

2. A video coding apparatus according to claim 1, wherein the interframe variance is calculated by using at least one of an absolute difference between the input video pictures and a pixel dispersion value of each of small blocks, into which the input video picture is divided.

3. A video coding apparatus according to claim 1, wherein the P frame interval decision means divides the input video picture into small blocks and carries out simple motion compensatory prediction by the use of a representative value per small block so as to decide the P frame interval.

4. A video coding apparatus according to claim 3, wherein the representative value uses either one of an average inside the small block and a dispersion value inside the small block.

5. A video coding apparatus according to claim 1, wherein the P frame interval decision means controls to make the frame interval small in the case where a motion compensatory prediction error is large while controls to make the frame interval great in the case where the motion compensatory prediction error is small.

6. A video coding apparatus according to claim 1, further comprising means for dividing a target video picture into small blocks so as to judge an edge region inside the video picture based on the dispersion value of pixel information on the small block.

7. A video coding apparatus according to claim 1, further comprising coding complexity prediction means for predicting coding complexity in each coding system based on the feature of the video picture inside the GOP so as to control a coding quantity at the time of coding in consideration of the complexity.

\* \* \* \* \*